United States Patent [19]
Williams et al.

[11] 3,976,723
[45] Aug. 24, 1976

[54] PREPARATION AND USE OF ACRYLIC IONOMER ELASTOMERS

[75] Inventors: Alan D. Williams, Richboro, Pa.; John A. Powell; Daniel T. Carty, both of Willingboro, N.J.; James A. Oline, Wyncote, Pa.

[73] Assignee: Rohm and Haas Company, Philadelphia, Pa.

[22] Filed: Mar. 24, 1975

[21] Appl. No.: 561,563

Related U.S. Application Data

[60] Division of Ser. No. 315,373, Dec. 15, 1972, abandoned, which is a continuation-in-part of Ser. No. 82,194, Oct. 19, 1970, abandoned.

[52] U.S. Cl. .............................. 260/885; 260/42.49; 260/DIG. 31; 526/14; 526/26; 526/49
[51] Int. Cl.$^2$ .......................................... C08L 31/02
[58] Field of Search .......... 260/885, 86.1 R, 78.5 T, 260/DIG. 31

[56] References Cited
UNITED STATES PATENTS

| | | | |
|---|---|---|---|
| 2,726,230 | 12/1955 | Carlson | 260/86.1 |
| 3,322,734 | 5/1967 | Rees | 260/79.3 |
| 3,502,745 | 3/1970 | Minton | 260/878 |
| 3,789,035 | 1/1974 | Isamu et al. | 260/78.5 T |

*Primary Examiner*—Carman J. Seccuro
*Attorney, Agent, or Firm*—Michael B. Fein

[57] ABSTRACT

An alkyl acrylate polymer is cured by condensing carboxyl groups of the polymer with a polyvalent metal oxide to produce polymeric metallo-carboxylates characterized by a three dimensional cross-linked structure. Metallocarboxylates of improved characteristics are produced by neutralizing at least some of the carboxyl groups by reaction with a basic reagent prior to condensation with the polyvalent metal oxide. Preferably the basic reagent is a monovalent metal compound such as potassium hydroxide.

7 Claims; No Drawings

PREPARATION AND USE OF ACRYLIC IONOMER ELASTOMERS

This is a division of application Ser. No. 315,373 filed Dec. 15, 1972, now abandoned; which is a continuation-in-part of Ser. No. 82,194 filed Oct. 19, 1970, now abandoned.

This invention relates to acrylic elastomers of improved properties. More particularly, the invention relates to vulcanizable acrylic elastomers and to an improved process for their manufacture.

Commercially available acrylic elastomers possess thermal and oxidative stability and resistance to sulfur-bearing oils after vulcanization superior to most other elastomers, especially natural and synthetic rubbers. Vulcanized products made from these acrylic elastomers thus have desirable properties for use in gaskets, seals, O-rings, belting, wire coatings, hydraulic hose, weather stripping, windshield wipers and generally as extruded or molded rubber products.

United States Patent Application Ser. No. 219,167, filed Jan. 14. 1972, now U.S. Pat. No. 3,745,196, a continuation-in-part of Ser. No. 827,945, filed May 26, 1969, now abandoned, Lane et al., discusses the search for acrylic elastomers of a combination of desired properties. The Lane et al. elastomers are di- or multi-stage polymers in which the polymer formed in the initial stage is based on an alkyl acrylate. The elastomers may contain a curing site monomer which is disclosed as a polyfunctional monomer containing either two points of carbon-to-carbon unsaturation differing in reactivity or one point of unsaturation and an active halogen.

Carlson, U.S. Pat. No. 2,726,230, Dec. 6, 1955, shows acrylic compositions and a method of producing the compositions in which a plastic alkyl acrylate interpolymer containing a controlled amount of combined free carboxyl groups is prepared. The polymer is admixed with a polyvalent metal oxide, and the resulting plastic composition is heated until a condensation reaction has occurred.

The prior art teaches the necessity of maintaining carboxylic acid-containing polymers in an acidic medium prior to and during a curing step so as to not impair or destroy free hydroxyl groups. For example Carlson teaches that coagulation of acidic latices obtained from an aqueous emulsion is effected so as not to impair or destroy the free carboxyl groups of the polymer. The patent teaches that this may be accomplished by admixing the latex with a dilute (ca. 3–15%) hydrochloric, sulfuric or acetic acid solution, or an acidified alcohol solution such as ethyl alcohol, or a combination of salt (NaCl) and alcohol, or by a dilute (1 to 30%) acidic aqueous solution of a polyvalent metal salt of a strong acid such as calcium chloride, calcium nitrate, zinc chloride, alum and others. Carlson, column 6, lines 27 to 48.

The present invention relates to acrylic polymers which are characterized by the presence of at least some neutralized carboxyl groups and to a process for curing such polymers wherein the process is carried out in a basic medium. It has been found that the acrylic polymers of the present invention, when cured, result in elastomers of improved tensile strength. Furthermore the present elastomers exhibit enhanced processing characteristics particularly retaining form and body during extrusion.

The polymers of the present invention can be described as a curable composition of a one, two or multi-stage polymer of at least one alkyl acrylate and a copolymerizable ethylenically unsaturated carboxylic acid, the composition characterized in that at least some of the carboxylic acid groups contained therein are neutralized with a basic reagent.

The curable composition of the present invention is a polymer of (a) 50 to 99 5 parts by weight, preferably 60 to 99 parts of an alkyl acrylate wherein the alkyl group contains 1 to 16 carbon atoms or a mixture of $C_1$ to $C_{16}$ alkyl acrylates; (b) 0.5 to 20 parts by weight, preferably 1 to 5 parts, of a copolymerizable ethylenically unsaturated carboxylic acid; (c) to 30 parts by weight, or 5 to 20 parts, of a different ethylenically unsaturated or monovinylidene monomer interpolymerizable therewith; (d) 0 to 5 parts by weight, or 0.1 to 3 parts of a non-carboxylic acid-containing curing site monomer; and (e) 0 to 3 parts by weight or 0.05 to 1 parts, of a cross-linking monomer, all based on 100 parts by weight of monomer mixture.

The invention also relates to a process for curing an alkyl acrylate polymer in which carboxyl groups of the polymer are condensed with a polyvalent metal oxide to produce polymeric metallo-carboxylates characterized by a three-dimensional cross-linked structure. This process is improved by neutralizing at least some of the carboxyl groups by reaction with a basic reagent prior to condensation with the polyvalent metal oxide to produce polymeric metallo-carboxylates of improved processability and increased tensile strength.

In a preferred embodiment of the present invention, the curable acrylic composition is formed of at least two polymer components. The acrylic composition contains units of a carboxylic acid in at least one stage. The composition is described as comprising: (A) 10 to 90 parts by weight of a first stage addition polymer of; (a) 50 to 100 percent by weight of an alkyl acrylate, wherein the alkyl group contains 1 to 16 carbon atoms or a mixture of $c_1$ to $C_{16}$ alkyl acrylates; (b) 0 to 20 percent by weight of a copolymerizable ethylenically unsaturated carboxylic acid and (B) 90 to 10 parts by weight of a final-stage polymer prepared in the presence of a product containing the first-stage addition polymer and comprising the polymer of: (a) 50 to 100 percent by by weight of an alkyl acrylate wherein the alkyl group contains 1 to 16 carbon atoms or mixture of $C_1$ to $C_{16}$ alkyl acrylates; and (b) 0 to 20 percent by weight of a copolymerizable ethylenically unsaturated carboxylic acid, the overall composition further characterized in that it contains 1 to 5 parts by weight of units derived from ethylenically unsaturated carboxylic acid and that at least 10% of these groups are neutralized with a basic reagent.

Also falling within the scope of this invention are vulcanized elastomers formed by compounding and curing the novel acrylic compositions. As has been pointed out, applicants have found that neutralizing at least some of the carboxyl groups of the carboxyl containing elastomers prior to curing with a polyvalent metal oxide results in cured polymers of improved tensile strength. Since it is not known with assurance what structural or chemical differences, imparted to the cured polymers by prior neutralization, cause the improved tensile strength, the resulting cured polymers cannot be described in a manner sufficient to distinguish them from prior art non-neutralized cured polymers, except by reference to the polymer as a product of the distinguishing process.

The suitable compositions of the present invention are polymers of 50 to 99.5 parts by weight of an alkyl acrylate or mixture of alkyl acrylates. When the acrylic compositions are formed of at least two polymers components, the first stage is an addition polymer of 50 to 100 parts by weight, preferably 50 to 60 parts, of an alkyl acrylate or mixture of alkyl acrylates and the final stage is an addition polymer of 50 to 100 parts by weight, preferably 50 to 60 parts, of an alkyl acrylate or mixture of alkyl acrylates. Alky acrylates suitable in the compositions are those of 1 to 16 carbon atoms, preferably those of 1 to 8 carbon atoms. These alkyl acrylates include but are not limited to n-butyl acrylate, n-hexyl acrylate, 2-ethylhexyl acrylate, stearyl acrylate and the like, and mixtures thereof. The use of n-butyl acrylate is preferred because it is relatively inexpensive, readily available, and is readily handled during emulsion polymerization reactions.

The compositions contain 0.5 to 20 parts by weight, preferably 1 to 5 parts, of a copolymerizable ethylenically unsaturated carboxylic acid. When the acrylic compositions are formed of at least two polymer components, either of the first stage or the final stage is an addition polymer of 0 to 20 parts by weight, preferably 1 to 5 parts, of the carboxylic acid provided that the polymer contains at least 0.5 part acid in at least one or a combination of stages. The carboxylic acids that are used in one or more stages are characterized by possessing one or more olefinic carbon-to-carbon double bonds and one or more carboxyl groups and are interpolymerizable with acrylic esters. Thus the acids which may be utilized include monocarboxyl and polycarboxyl, monoolefinic and polyolefinic acids including for example, such widely divergent materials as acrylic acid, the alpha-alkyl acrylic acids, crotonic acid, beta-acryloxy propionic acid, acryloxy polyhydracryloxy propionic acid having the structure $CH_2=CHCOO(CH_2CH_2COOO)_nH$, where $n$ is 3 or 4, alpha- and beta vinyl acrylic acid, alphabeta isopropylidene propionic acid, sorbic acid, cinnamic acid, maleic acid, oleic acid, undecyclenic acid, ricinoleic acid, linoleic acid, linoleic acid and others.

Best results are obtained by the utilization of one or more olefinically-unsaturated carboxylic acids containing at least one activated olefinic carbon-to-carbon double bond, that is, an acid containing an olefinic double bond which readily functions in an addition polymerization reaction because of the of double bond being present in the monomer molecule either in the alpha-beta position with respect to a carboxyl group thusly

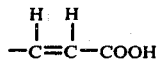

or attached to a terminal methylene grouping thus $CH_2=O<$. In the alpha-beta unsaturated carboxylic acids the close proximity of the polar carboxyl group to the double-bonded carbon atoms has a strong activating influence rendering the substances containing this structure very readily polymerizable. Likewise, when an olefinic double bond is present attached to a terminal methylene group, the methylenic hydrogen atoms are very reactive making the double bonded carbon atoms readily polymerizable.

Illustrative alpha-beta unsaturated carboxylic acids within the above-described preferred class include maleic acid, fumaric acid, crotonic acid, alpha-butyl crotonic acid, angelic acid, hydrosorbic acid, cinnanic acid, m-chloro cinnamic acid, p-chloro cinnamic acid, umbellic acid, beta-benzal acrylic acid beta-methyl acrylic acid (isocrotonic acid or 2-butenoic acid), and other monolefinic monocarboxylic acids; sorbic acid, alpha-methyl sorbic acid, alpha-ethyl sorbic acid, alpha-chloro sorbic acid, alpha-bromo sorbic acid, beta-chloro sorbic acid, alpha-, beta-, or gamma-, epsilon dimethyl sorbic acid, alpha-methyl-gamma-tenzal crotonic acid, beta-(2-butenyl) acrylic acid (2,4-heptadiene-oic-1), 2,4-pentadienoic acid, 2,4,6-octatrienoic acid, 2,4,5,8-decatetrienoic acid, 1-carboxy-1-ethyl-4-phenyl butadiens-1,3,2,6-dimethyl decatriene-(2,6,8)-oic-10, alpha-beta-isopropylidene propionic acid having the structure

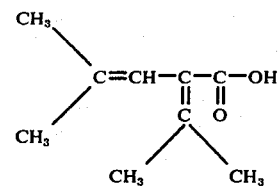

alpha-vinyl cinnamic acid, alpha-isopropenyl-furfural acetic acid, alpha-isopropenyl-cinnamenyl acrylic acid, and other polyolefinic monocarboxylic acids; hydromuconic acid, glutaconic acid, and other monolefinic polycarboxylic acids; 3-carboxy-pentadiene(2,4)-oic-1, muconic acid, and other polyolefinic polycarboxylic acid.

Olefinically-unsaturated carboxylic acid containing the $CH_2=C<$ structure include acrylic acid, alpha-chloro acrylic acid, methacrylic acid, ethacrylic acids, alpha-isopropylidene acrylic acid, alpha-styryl acrylic acid (2-carboxyl-4-phenyl butadiene-1-carboxy-butadiene-1,3), alpha-vinyl acrylic acid, beta-acryloxy propionic acid, beta-acryloxy acetic acid, and others.

The most preferred carboxylic acids are monoolefinic with their olefinic double bond in alpha-beta position to the carboxyl group and present in a terminal methylene grouping, such as the acrylic and alpha substituted acrylic acids including acrylic acid, methacrylic acid and the like.

Part of the components making up the polymers of any of one or more stages of the acrylic composition may be replaced by a different ethylenically unsaturated or monovinylidene monomer interpolymerizable with the other components. This class of monomers does not include alkyl acrylates wherein the alkyl group contains 1 to 16 carbon atoms or ethylenically unsaturated carboxylic acids. Examples of these different ethylenically unsaturated or monovinylidene monomers are vinyl esters, alkyl methacrylate esters and acrylonitrile. Whenever any of this class of monomers is present in the compositions of the invention, it is preferably found in quantities of 5 to 20 parts by weight Also part of the components making up the polymers of the acrylic compositions may be replaced by a noncarboxylic acid-containing curing site monomer. Whenever any of these curing site monomers is present, it is preferably present in quantities of 0.1 to 3 parts by weight. These curing site monomers include, but are not limited to, polyfunctional monomers containing either two points of carbon-to-carbon unsaturation differing in reactivity or one point of unsaturation and an active halogen. The inclusion of these monomers provides sites fo subsequent curing or vulcanization. Exemplary of the curing-site monomers which contain two points of unsaturation are those difunctional monomers which contain one point of vinyl unsaturation relatively reactive with the monomers of the other groups used in preparing the first-stage polymer and another point of unsaturation that is relatively unreactive during the polymerization of the first-stage polymer, thereby leaving points of unsaturation after the polymerization of the first stage polymer is completed. These points of unsaturation remaining in the first-stage polymer provide sites for curing and vulcanization of the elastomer using free radical type initiators. Exemplary of these curing-site monomers are crotyl acrylate.

Part of the components making up the polymers of the present invention may be replaced by a cross-linking monomer. Whenever any of these monomers is present, it is preferably present in quantities of 0.05 to 1 part by weight. These components include polyfunctional unsaturated monomers capable of cross-linking any of the stages of the polymer and include di- and trivinyl aromatic compounds and acrylic and methacrylic esters of polyols such as butylene diacrylate and dimethacrylate, trimethylolpropane trimethacrylate and the like, vinyl acrylate and methacrylate and others.

Whenever an acrylic composition contains more than one polymeric stage, the weight ratio of the first-stage polymer to the last or the total of the latter stage polymers varies from about 1:9 to about 9:1.

The acrylic compositions may be prepared by emulsion, suspension or solution polymerization. In the preparation of compositions of at least two polymeric components, the first stage polymer is polymerized as a discrete phase from a mixture of desired monomer components together with initiators, soap or emulsifier, polymerization modifiers, chain transfer agents and the like. Upon completion of the polymerization of the first phase, i.e., substantial exhaustion of the monomers in the initial polymerization compositions, subsequent phases are then formed in sequence by polymerization in the presence of the first phase or in the presence of a product containing the first stage. The final stage polymer is then formed by polymerization in the presence of the first stage polymer or a product containing the first stage polymer, in the same emulsion or solution from a mixture of the desired monomers. The polymerization of the final phase is preferably conducted in such a fashion that substantially all of the final phase is formed on or near the surface of the first phase or first phase-containing product, and without the formation of substantial numbers of new particles in the emulsion.

It is generally desirable to charge the reactants of each stage, together with water, an emulsifier, catalyst or initiator, and a buffer, if needed, into a suitable reaction vessel. A chain regulator may be employed to control the molecular weight of each stage. Relatively lower molecular weight is generally preferred to prevent premature cure and vulcanization of the elastomer during fabrication and to aid flow properties. The first and any subsequent stage polymer reaction should be carried to substantial completion before charging the monomers that react in the following stage. It is desirable to push the polymerization reactions to completion by periodic addition of fresh initiator.

The polymerization reactions can be initiated by either thermal or redox-type initiator systems. Examples of thermal initiators include the organo-peroxide, such as benzoyl peroxide, substituted benzoyl peroxides, acetal peroxides, lauroyl peroxide, t-butyl hydroperoxide, di-t-butyl hydroperoxide; peresters, such as t-butyl peroxy-pivalate; azo-type initiators, such as azo-bis-isobutyronitrile; persulfates, such as sodium, potassium, or ammonium persulfate; and peroxyphosphates, such as sodium, potassium, or ammonium peroxyphosphate. Redox initiators include, for example, a combination of a hydroperoxide, such as hydrogen peroxide, t-butyl hydroperoxide, cumene hydroperoxide, diiso-propylbenzene hydroperoxide, and the like, and a reducing agent, such as sodium, potassium or ammonium bisulfite, metabisulfite, metabisulfite, or hydrosulfite, sulfur dioxide, hydrazine ferrous salts, isoascorbic acid, sodium formaldehyde sulfoxylate, and the like.

Examples of emulsifiers or soaps suited to the polymerization processes of the present invention include alkali metal and ammonium salts of alkyl, aryl, alkaryl, and aralkyl sulfonates, sulfates, and polyether sulfates, ethoxylated fatty acids, esters, alcohols, amines, amides, alkyl phenols, complex organo-phosphoric acids and their alkali metal and ammonium salts.

Chain transfer agents, including mercaptans, polymercaptans, and polyhalogen compounds are often desirable in the polymerization mix.

The acrylic compositions are neutralized according to the present invention by reaction with a basic reagent capable of neutralizing at least some of the carboxylic acid groups present. Generally these basic reagents include those reagents which neutralize carboxylic acids without destroying the emulsion, suspension or solution of acrylic polymer. Exemplary reagents include ammonia, calcium hydroxide, calcium oxide, potassium hydroxide and sodium hydroxide. The preferred reagents are compounds that disassociate form fom monovalent metal ions. The preferred reagent is potassium hydroxide. According to the present invention, improvements are obtained when at least one of the carboxyl groups are neutralized. Preferably the compositions are characterized by at least 10 percent and most preferably 25 to 50 percent neutralization of the carboxyl groups.

When the acrylic compositions is a two or multiple stage composition, the carboxylic acid containing stage may be the first stage, the final stage, any intermediate stage or combinations of these stages. In these cases, neutralization may be carried out after the formation of any carboxylic acid containing stage. Thus for example, with a three stage polymer in which only the first stage contains carboxylic acid groups, neutralization may be carried out after formation of the first stage but before formation of the second stage, after formation of the second stage but before formation of the third stage or after formation of the final stage or the neutralization may be partially carried out after formation of one stage and further carried out after formation of a subsequent stage.

The neutralized alkyl acrylate polymers are cured by condensing carboxyl groups of the polymer with a polyvalent metal oxide to produce polymeric metallo-carboxylates characterized by a three-dimensional cross-linked structure. In this step the neutralized carboxyl-containing acrylic ester interpolymer is admixed with the polyvalent metal oxide in any conventional manner such as by mill-mixing, in a Banbury-type or other internal mixer, by mixing an aqueous dispersion of the polyvalent metal oxide with a latex of the polymer and coprecipitating the mixed dispersion, and the like. The intermixing of the solid polymer with the metal oxide can be performed over a wide temperature range because of the reversibility of the ionic cure at elevated temperatures under high shear conditions. However if an epoxy resin is also added, moderate working temperatures will be required in order to avoid "scorching" of the stock. The mastication of the mixture should be continued until the resulting mixture is homogeneous with the metal oxide well dispersed in the polymer. Softeners, plasticizers, milling acids, etc., may be utilized to facilitate the mixing step. In any case, the resulting inter mixture should be plastic, workable, and homogeneous.

The polyvalent metallic oxides which may be utilized in the curing step are those of zinc, manganese, and cadmium, calcium, titanium, aluminum, barium, strontium, copper(ic), cobalt(ic), tin and others. Specifically, zinc oxide, calcium oxide, cadmium oxide (CdO), magnesium oxide, (MgO), dibutyl tin oxide, lead oxide (PbO), barium oxide (BaO), cobalt oxide ($Co_2O_3$), tin oxide (SnO), strontium oxide (SrO), and others produce superior results and are preferred. In addition, various metallic hydroxides, which in reality are hydrated polyvalent metallic oxides and upon heating or upon reaction with polymer carboxyl (—COOH) groups readily split off water, such as calcium hydroxide, barium hydroxide, and others also are utilizable to produce excellent, strongly elastic polymeric metallo-carboxylates.

The proportions of polyvalent metal oxide required for efficient cure will vary, of course, depending on the curing agent itself, on the interpolymerized acid or neutralized acid content of the polymer and on the fineness and compatibility of the metal oxide with the polymer. Amounts of metal oxide chemically equivalent to at least one-half the free and neutralized carboxyl content of the polymer should be utilized in order to produce strongly elastic polymeric metallo-carboxylates. For optimum results, the amount of curing agent should be at least equivalent chemically to the carboxyl and neutralized carboxyl content of the polymer. Substantially chemical equivalent amounts of a metal oxide such as zinc, calcium or cadmium oxide, for example, produce nearly transparent pure gum compositions.

When the optical properties of the product are not a factor, it is generally preferred to utilize excess curing agent since the agent has little adverse effect on elastic properties. In these instances, it is desirable to utilize amounts of curing agent in excess of stoichiometrical proportions and preferably twice or more stoichiometrical amounts. Generally, however, amounts of a curing agent such as zinc oxide varying 1 to 30% based on the weight of polymer will be found sufficient with amounts from 4 to 20% being preferred.

A convenient means of isolating these polymers is freeze-coagulation; i.e., cooling the emulsion to a point where breakdown of the emulsion occurs. Coagulation using a brine solution is also an effective means of isolation but care must be taken in choice of the salt used. It is preferred that the metal ion used in the polymer, in general, be identical to that used to prepare the coagulation medium otherwise exchange, with deleterious results, can occur.

The curing or "condensation" is a reaction which occurs with great ease at elevated temperatures. For example, it is so rapid that curing can be obtained during an extrusion operation without requiring a post cure treatment. Scorching is not a problem because of the reversibility of the cure under high shear conditions and elevated temperature, as is found in an extruder. The curing will occur to a certain extent upon long standing at room temperature but, however, since most manufacturing processes require shorter curing cycles, it is generally desirable to heat the plastic, metal oxide-containing polymer composition to cause the polymer to flow and coalesce and to insure efficient distribution or solubilization of the oxide throughout the composition. For the latter reasons, it is generally preferred to heat the plastic composition at temperatures varying from 125° to 400°F., more preferably 150° to 350°F. Below 125°F. the condensation reaction is slow and above 400°F. excessive blowing and pitting of the composition occurs. The condensation reaction will generally be complete in from 1 to 10 minutes to as long as 2 hours at temperatures of 125° to 400°F. Since one of the products of the salt-formation reaction is water, the cure of thick cross sections is preferably effected in a mold under a pressure and at a temperature at which water will not be vaporized. By such a method it is possible to prevent blowing and pitting in the interior of the cross sections in a mold at temperatures of from 150° to 300°F. under pressures from 1,000 to 30,000 lbs./sq. in. or more.

To assist those skilled in the art, the following modes of operation are set forth as illustrations, parts and percentages being by weight unless otherwise specifically noted. In the descriptions of the compositions a single slash (/) separates the monomer proportions making up a particular stage of a polymer while a double slash (//) indicates different polymer stages produced by a sequential procedure. The following abbreviations are used: ethyl acrylate (EA), butyl acrylate (BA), methacrylic acid (MAA), and butylene diacrylate (BDA).

EXAMPLE 1

This and the following examples illustrate preparation of both prior art acrylic acid polymers and polymers of the present invention and compare tensile strength and percent elongation at break of the polymers.

To a 3-liter, three-neck flask equipped with a stirrer, addition funnel, nitrogen dip tube and condenser are added 1056 parts ethyl acrylate, 44 parts methacrylic acid, 3125 parts deionized water, 5.5 parts sodium lauryl sulfate and 0.5 part cumene hydroperoxide. A flow of nitrogen is used to displace oxygen from the reaction mixture. The temperature of the mixture is adjusted to 40°C. and 0.3 parts of sodium formaldehyde sulfoxalate is added. A vigorous reaction ensues which, after 1.5 hours, is essentially complete. The reaction mixture is cooled to 30°C. and an aliquot (1772 gm) of the emulsion is neutralized with dilute aqueous KOH (3.3 parts KOH in 300 parts DI water). Both the partially neutralized polymer and the unneutralized polymer are isolated by freeze-coagulation. 100 parts of the resulting polymers were compounded on a cold rubber mill with 40 parts of FEF (fast extruding furnace) grade carbon black and 4 parts of zinc oxide. Tensile slabs were prepared by compression molding at 350°F. and 100 tons of pressure for 10 minutes. Tensile strength and percent elongation are determined and reported as indicated in Table 1.

EXAMPLE 2

Using procedures similar to those of Example 1, copolymers of 98 parts ethyl acrylate and 2 parts methacrylic acid and prepared and compared for tensile strength and percent elongation at break with results as shown in the Table 1.

EXAMPLE 3

This example illustrates preparation of two-stage heteropolymers and compares such heteropolymers of the prior art with those of this invention.

A two-stage heteropolymer is prepared having a first stage comprising ethyl acrylate and methacrylic acid and a second stage of ethyl acrylate and butylene diacrylate. To 658 parts of stage I (prepared as in Example 1) emulsion (containing 200 g. polymer solids) is added 355 parts deionized water, 4 parts aqueous acetic acid, 1.1 parts sodium lauryl sulfate, 218 parts ethyl acrylate, 2.2 parts 1,3-butylene diacrylate, and 0.5 parts cumene hydroperoxide. The reaction temperature is adjusted to 47°C. and 0.3 parts sodium formaldehyde sulfoxalate is added. A vigorous reaction ensues which after 1 hour is essentially complete. The polymer is isolated by freeze-coagulation. Samples are compounded and cured as in Example 1. Tensile strength and percent elongation are determined and reported as indicated in Table 1.

EXAMPLE 4

Using procedures similar to those of Example 3, two-stage copolymers of composition EA/MMA//EA/BDA in proportions 49/1//48.5/1.5 are prepared and compared for tensile strength and percent elongation at break with results as shown in Table 1.

EXAMPLE 5

Using procedures similar to those of Example 3, two stage copolymers of composition BA/BDA/MAA//EA/MAA; 57.45/.05/2.5/38.5/1.5 are prepared and compared for tensile strength and percent elongation at break with results as shown in Table 1.

What is claimed:

1. In a process for curing alkyl acrylate polymers containing free carboxyl groups, said alkyl acrylate polymer being polymerized from (a) 50 to 99.5 parts by weight of alkyl acrylate and (b) 0.5 to 20 parts by weight of a copolymerizable ethylenically unsaturated carboxylic acid, comprising condensing said carboxyl groups with a polyvalent metal oxide to produce polymeric metalo-carboxylate elastomers characterized by a three dimensional cross-linked structure, the improvement comprising neutralizing some of the carboxyl groups with a monovalent metal oxide or ammonia prior to condensing with the polyvalent metal oxide.

2. The process of claim 1 further including reinforcing filler.

3. The process of claim 1 wherein said reinforcing filler is carbon black.

4. The process of claim 1 wherein the monovalent metal oxide is potassium hydroxide and said polyvalent metal oxide is zinc oxide.

5. The process of claim 1 wherein the amount of polyvalent metal oxide used to produce polymeric metalo-carboxylates is at least one-half the free and neutralized carboxyl content of the polymer so as to produce nearly transparent compositions.

6. The process of claim 1 wherein the acrylic ionomer elastomer is a single or multiple stage polymer polymerized from a monomer system comprising 50–99 parts of an alkyl acrylate wherein the alkyl group contains 1–16 carbon atoms and, in the first or final stage when said polymer is multiple-stage, 1 to 5 parts by weight of a copolymerizable ethylenically unsaturated carboxylic acid.

7. The process of claim 1 wherein the acrylic ionomer elastomer further contains 0.05 to 1 part by weight of a cross-linking monomer.

\* \* \* \* \*

Table 1

| Example | Composition | Percent Neutralization | Strength | Percent Elongation at Break |
|---|---|---|---|---|
| 1 | EA/MAA; 96/4 | 0 | 960 | 570 |
| 1 | EA/MAA; 96/4 | 33 | 1450 | 460 |
| 2 | EA/MAA; 98/2 | 0 | 330 | >850 |
| 2 | EA/MAA; 98/2 | 33 | 700 | >850 |
| 3 | EA/MAA//EA/BDA; 48/2//49.5/0.5 | 0 | 750 | 440 |
| 3 | EA/MAA//EA/BDA; 48/2//49.5/0.5 | 33 | 1050 | 330 |
| 4 | EA/MAA//EA/BDA; 49/1//48.5/1.5 | 0 | 480 | 540 |
| 4 | EA/MAA//EA/BDA; 49/1//48.5/1.5 | 100 | 950 | 410 |
| 5 | BA/BDA/MAA//EA/MAA; 57.45/.05/2.5//38.5/1.5 | 0 | 700 | 650 |
| 5 | BA/BDA/MAA//EA/MAA; 57.45/.05/2.5//38.5/1.5 | 100 | 1300 | 485 |